United States Patent [19]
Lawrence

[11] Patent Number: 5,210,719
[45] Date of Patent: May 11, 1993

[54] SWEEP FREQUENCY PEST CONTROL APPARATUS

[75] Inventor: Lucas G. Lawrence, San Bernardino, Calif.

[73] Assignee: Daniel J. Bondy, Las Vegas, Nev.

[21] Appl. No.: 791,091

[22] Filed: Nov. 12, 1991

[51] Int. Cl.⁵ .......................... H04B 1/02; H03B 1/00
[52] U.S. Cl. .................... 367/139; 43/132.1; 331/178
[58] Field of Search ............... 367/139; 43/124, 132.1; 116/22 A; 340/384 E; 331/4, 178

[56] References Cited

U.S. PATENT DOCUMENTS

| | | | |
|---|---|---|---|
| 4,366,644 | 1/1983 | Lawrence | 43/132 R |
| 4,562,561 | 12/1985 | Ackley | 367/139 |
| 4,782,623 | 11/1988 | Lawrence | 43/132.1 |

OTHER PUBLICATIONS

Saksena et al., "A Transistorized swept frequency generator for . . ." Jou. of the Inst. Electronics & Telecommunication Engineers, vol. 22, #3, pp. 119-120, Mar. 1976.

*Primary Examiner*—Ian J. Lobo
*Attorney, Agent, or Firm*—Christie, Parker & Hale

[57] ABSTRACT

An apparatus and method utilizing a sweep-frequency, high voltage generator coupled to an applicator gun for feeding electric power into pest-infested dielectrics, for example termite-infested wood. Utilizing a conventional line frequency of 120 or 60 Hz, the generator produces 140 kilovolts propagated within a spectral band ranging from 15 to 120 kHz and rich in harmonics. Output is discharged through a high-voltage energy storage capacitor charged using an insulated gate bipolar transistor driven by a variable frequency inductively coupled multivibrator. The output voltages penetrate dielectrics and electrocute the pests inside. The invention is effective against insects having hard exoskeletons comprised substantially of cuticulin, chitin, and sclerotin.

9 Claims, 3 Drawing Sheets

SWEEP FREQUENCY PEST CONTROL APPARATUS

FIELD OF THE INVENTION

This invention generally relates to electronic apparatus for pest control and specifically relates to electronic apparatus for applying a sweep-frequency high-voltage waveform to pests having hard, insulating exoskeletons which infest dielectrics such as trees, wood structures, and buildings.

BACKGROUND OF THE INVENTION

This application pertains to a sweep-frequency generator and electrical applicator gun for control of termites and other insects. It is an improvement on the method and apparatus disclosed in U.S. Pat. Nos. 4,223,468 4,366,644, and 4,782,623.

Previous systems of electric termite control as described in the above-cited patents use electronic vibrators, oscillators, and single-frequency pulse capacitive discharge techniques for high-voltage, high-frequency generation of linear pulses. These devices have limited spectrum widths and cannot cover the wide range of capacitive, inductive, and reactively resistive elements of dielectrics encountered under actual field conditions, especially insects with hard exoskeletons.

Whereas the termite is a soft-bodied creature, the outer skin of many insects harmful to domestic construction and man hardens to a protective armor. The main ingredient of some insect exoskeletons is chitin, which is a light-weight, plastic-like material highly resistant to water and corrosives. Chitin is endowed with excellent dielectric qualities; it does not conduct electricity easily. Other insect exoskeletons are comprised substantially of sclerotin and cuticulin. Cuticulin resembles the substance of the human fingernail and renders an insect's biological mass waterproof. Thus, hard exoskeleton insects can be characterized as living, capacitor-like components having variable AC-reactive and resistive properties capable of impeding the flow of electricity.

SUMMARY OF THE INVENTION

The present invention provides power output swept over a frequency spectrum preferably ranging from 15,000 to 120,000 Hz. This sweep is provided by an inductance-controlled multivibrator, and the output frequency of the multivibrator is applied to the gate of an IGBT (insulated gate bipolar transistor) rated at 1000 volts 300 amperes. The IGBT is connected in a power-circulating mode to an energy storage capacitor and primary winding of a high-voltage transformer. Several IGBTs can be operated in a parallel configuration, enabling quasi-unlimited levels of frequency-swept high voltage power to be generated. The only restrictions are the size and quality of components used.

To secure a high or near-perfect insect kill rate, the invention is specifically intended to overcome the aforementioned impediments by sweeping a broad range of high-voltage electrical frequencies across the target. One of the frequencies tends to mortally affect a given insect's neurological complex, produces a synaptic override and thus causes a kill within milliseconds. The high voltage simultaneously applied powerfully augments this process. Preferably, the operating frequency is chosen to range between 15 to 120 kHz. Output energy at this frequency does not pose dangers to the infested wood and equipment operator, but is capable of penetrating dielectrics and will electrocute insects residing therein.

The invention uses a probe gun with an elongated external application electrode extending from one end, to deliver the energy to an infested structure. Target illumination is furnished by an electrically non-conductive fiber-optic assembly and plastic Fresnel lens. A hand-guard protects the equipment operator from high-voltage backflash from the electrode assembly. The apparatus is activated upon pulling the trigger switch. The power emanated via the application electrode then flows into contacted wood.

The quasi-unlimited power output of this apparatus is useful in both small-scale and large-scale applications, including homes, trees, wooden bridges and other construction infested by termites, beetles, and carpenter ants. In large-scale applications, the applicator gun can be handled by hoists and operated by remote control. In these latter instances, the treatment voltage can be raised to several million volts, and the energy is emanated in the form of frequency-swept pulse bursts to avoid raising the wood's temperature to incendiary levels.

DETAILED DESCRIPTION

In the following detailed description of the preferred embodiments, specific terminology is used for the sake of clarity. However, the invention is not limited to the specific terms selected, but rather includes all technical equivalents functioning in a substantially similar manner to achieve a substantially similar result.

Figure 1A:
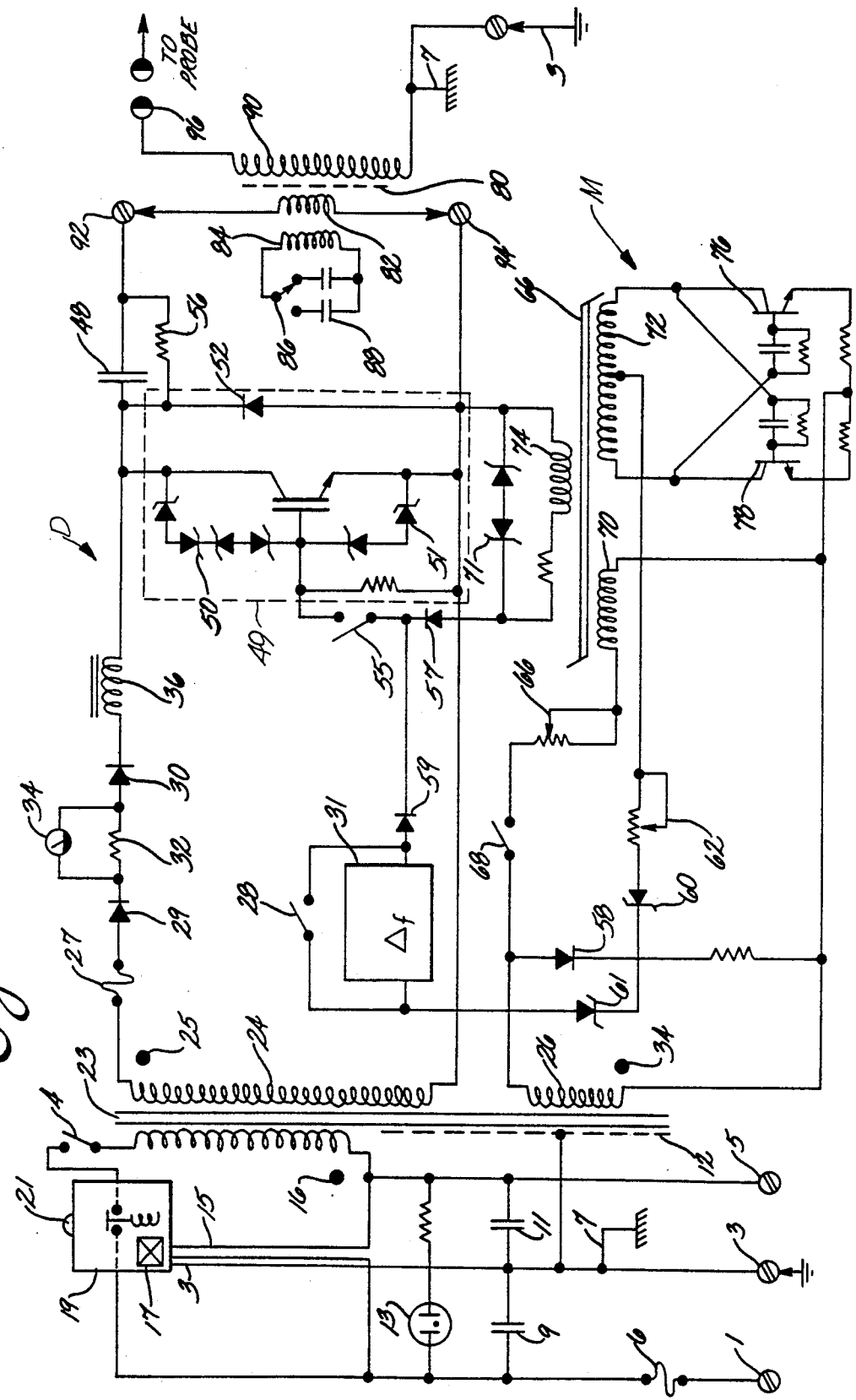
FIG. 1A is a schematic diagram of a sweep-frequency power generator circuit according to the present invention.
Figure 1B:
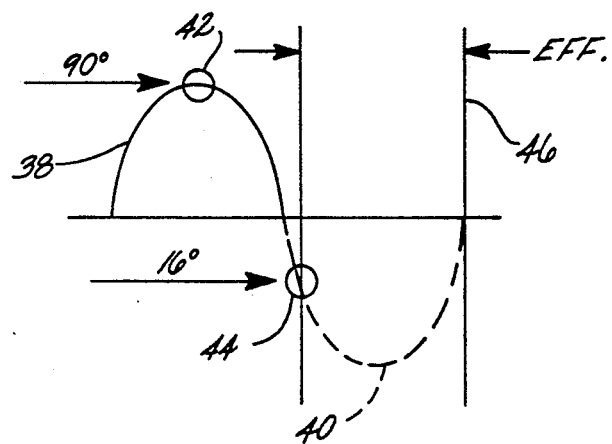
FIG. 1B to 1E are waveform diagrams of signals produced by the circuit of FIG. 1A.
Figure 1C:
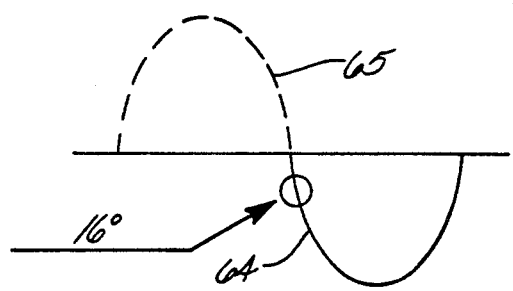
Figure 1D:
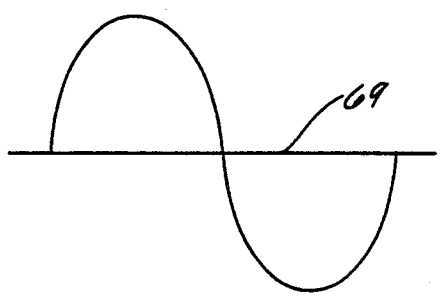
Figure 1E:
Figure 2:
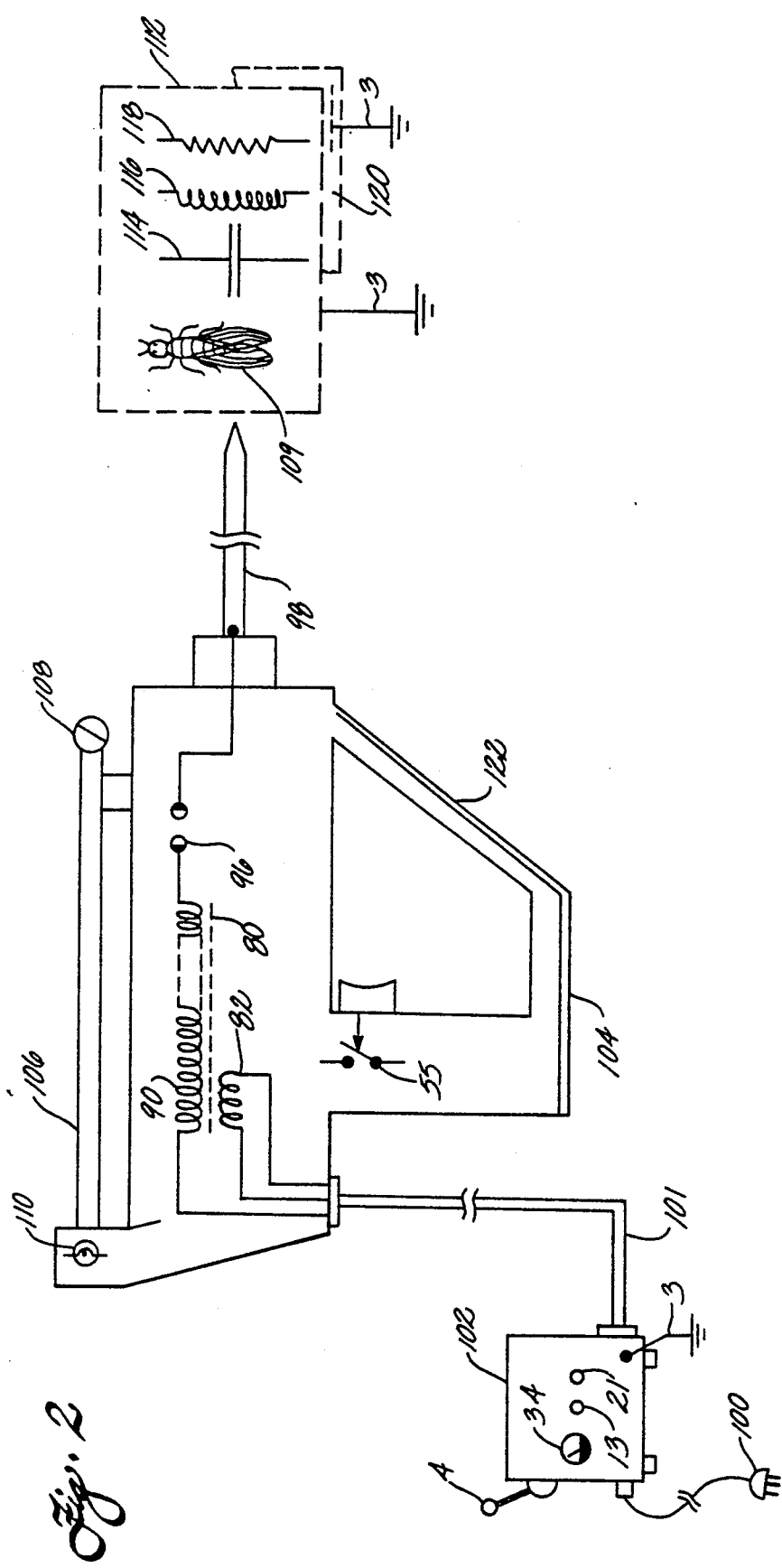
FIG. 2 is a drawing of an applicator gun for the circuit of FIG. 1A and its feeder equipment.

The preferred embodiment of the invention preferably comprises electric circuitry shown in FIG. 1A which is housed in an applicator gun 103 shown in FIG. 2. The applicator gun is comprised of a non-conductive (preferably plastic) housing 104 for enclosing and protecting the circuit of FIG. 1, a hand-guard 122, an application electrode 98 extending from the front of the housing, and a battery-operated light source 110 for illuminating the work area 109 by means of a fiber optic assembly 106 furnished with a Fresnel lens 108.

The gun's internal electrical elements comprise a gun step-up transformer 80 with a primary winding 82 and secondary winding 90, an impedance safeguard in the form of a spark gap 96, and a trigger-type power switch 55 for activating energy production.

Electrical treatment power is conveyed by the extended electrode 98 to the work area, such as wood 120 infested by pests 110. When energized, the electrode 98 feeds electrocuting energy into and through the insects' bodies and on into the wood. As the applied electrical energy sweeps through an assigned frequency spectrum, the complex capacitive, inductive, and resistive properties 114, 116, 118 innate to insects are penetrated through in reactive modes as current from the electrode seeks a true ground 3. These modes cause rapid electrical changes to occur which, in turn, affect the target insects' neurological complex and cause death within milliseconds.

The electrode 98 may be applied to any section of wood or structural member the operator elects because the high-voltage, high-frequency energy is conducted through the wood 120. According to well known laws of physics, the applied electrical energy seeks a ground return path of high conduction to a ground 3. Because the moist, carbon-rich bodies of the insects provide the highest conductance, they experience the highest current density, resulting in immediate electrocution. A heavily armored, chitin-clad beetle experiences similar effects as the frequency-swept high voltage propagates over and through it.

In a typical application, the gun operator sweeps the apparatus back and forth over an insect-infested structure. The electrical energy radiates into the structure because of its high voltage and high frequency. As needed, the gun may be operated in a sweep-frequency mode or in a single-frequency pulse-burst mode. Ants and beetles are preferably treated in the sweep-frequency mode, while termites, being soft-bodied creatures, are treated in the pulse-burst mode.

Electrical power to the gun is provided by the circuit of FIG. 1A fed thru a cable 101. The cable and a grounding wire therein are connected to a power unit 102.

Referring now to both FIG. 1A and 2, the power unit is connected to a conventional 120 VAC power line (comprising a hot line 1, ground line 3, and neutral line 5) by a three-prong, grounded plug 100. A main power switch 4 activates the unit 102. A conventional fuse 6 (typically rated at 5 amps) provides overload protection. Ground line 3 is tied to the chassis at 7. Two capacitors 9,11 prevent R. F. frequency from flowing into domestic power lines. A separate terminal 3 provides connection for an auxiliary Earth ground. POWER ON status is signaled by a neon lamp 13 coupled to a protection resistor 13. If the machine is properly grounded, the main power transformer 23 is respectively activated by relay control and the READY status indicated by a second neon lamp 21. For ground sensing, the power unit can incorporate a ground fault circuit interrupter 19 such as that disclosed in applicant's co-pending application Ser. No. 07/790,552.

Using such a ground fault circuit, if the main power unit 102 is properly grounded, relay 17 and its coil 18 are energized, establishing a circuit path from hot line 1 to switch 4 and causing lamp 21 to shine brightly.

A step-up transformer 23 has a primary winding 23' coupled between switch 4 and the neutral input line. Two secondary windings 24, 26 feed a driver section D and a multivibrator section M of FIG. 1A, respectively. The polarity symbol 25 on the power transformer's secondary winding 24 denotes the sine condition. Symbol 34 denotes the cosine position of the incoming sine wave on the second secondary transformer winding 26. High voltage output from the driver secondary winding 24 is fed on line 24' to a high-voltage fuse 27 which provides extra overload protection. An ammeter 34 protected by a shunt resistor 32 monitors current levels on line 24'. The meter can be mounted on a face plate of the power unit 102 as shown in FIG. 2.

The power output section of the invention is based on a capacitor 48 for energy storage, and an insulated gate bipolar transistor (IGBT) 49. The capacitor 48 is rapidly charged by half-wave rectified current 42 and discharged by the frequency-controlled IGBT 49. This causes oscillations in the primary winding 82 of a high-frequency transformer 80. The high turns ratio between the primary winding 82 and secondary winding 90 results in the generation of high voltage. This voltage jumps across a spark gap 96 (an impedance guard) and is conveyed to the gun's applicator electrode 98.

The circuit of FIG. 1A operates in a phase-locked mode. The sine excursion 38 of the incoming sine wave, shown in FIG. 1B, is obtained by half-wave rectification provided by series-connected diodes 29,30, and the resultant DC is fed through a choke 36 into the energy storage capacitor 48.

These precise waveform relationships are necessary in order to charge the capacitor 48 during the halfwave sine excursion, and to discharge it in "dead time" 40 during the cosine 64 excursion shown in FIG. 1C. Use of the "dead time" 40 is mandatory to permit high-voltage, high-frequency generation when the electrical energy stored in the capacitor 48 is released by the IGBT 49. At the 90-degree point 42 of the rectified sine wave, the peak DC voltage of the storing main capacitor 48 is root mean square voltage (rms)×1.41.

The IGBT 49 receives sweep frequency steering signals from the multivibrator section M, which can use transistors 76, 78 coupled as an astable, transistorized multivibrator. Preferably the lowest or quiescent frequency of the multivibrator is 15,000 Hz. The multivibrator is inductively coupled from the primary winding 72 of a steering transformer 66 into the secondary winding 74. An output signal of the multivibrator is fed via switch 55 into the gate of the IGBT 49.

The gate of the IGBT 49 is protected by back-to-back Zener diodes 50, 51 to safeguard the IGBT 49 against over-excitation and transient voltages. Respective damping and clipping functions are also provided by back-to-back Zener diodes 71a, 71b placed across the secondary winding 74 of the multivibrator transformer 66. A gun trigger switch 55 causes energy output from IGBT 49 to commence.

The multivibrator is designed to sweep upwards from 15 kHz to 120 kHz, during the cosine cycle 64 and down during transition from the cosine 90-degree position to zero. The multivibrator's excitatory and sweep states are achieved by interlocked methods, as described below.

First, the multivibrator transformer and its transistors 76, 78 are DC-energized by means of a Zener diode 60 coupled to the center tap 72' of winding 72. The diode 60 is selected such as not to conduct the incoming, half-wave rectified 58 DC until a position of 16 degrees arrives on the incoming cosine wave 64. The diode 60 can comprise a device of type 1N 4742. Thus, the multivibrator starts frequency generation at 15 kHz.

The effective inductance of the multivibrator's core and primary winding 72 is then altered by a full-wave AC current 69 (FIG. 1D) applied via switch 68 over a sweep-width potentiometer 66 to a magnet winding 70. This permits rapid saturation and de-saturation of core 66. A saturated core 66 causes the inductance of the winding 72 to drop to a lower value, causing the multivibrator's 78,76 output frequency to rise. Core 66 de-saturation causes the inductance of winding 72 to increase, causing the multivibrator frequency to drop.

This is but one example of how rapid sweep-frequency control of the invention's power output stage may be secured. Suitably phase synchronized VCOs (voltage-controlled oscillators) and other devices may also be used instead of the induction-coupled multivibrator of FIG. 1A.

The multivibrator can be cascaded using frequency generators 31 to generate odd and even frequency harmonics, which have been found conducive to effective insect control. The cascaded frequency generators 31 can be timed by a Zener diode 61 to inaugurate the various power cycles at selected points on the cosine-wave excursion 64.

In addition, conventional pulse-burst operation of this new system is made possible by closure of a switch 28. Closure of the switch 28 applies a brief burst of positive DC voltage 53 through diode 59 to the gate of the IGBT 49, causing it to discharge the main energy storage capacitor 48 with one massive burst of energy. Frequency of the subsequent oscillation will then be determined by the value of the main capacitor 48 and the series-connected primary winding 82 of the gun transformer 80. During burst-pulse operation, the apparatus preferably produces a frequency of 67 kHz.

A high-power diode 52 coupled across the emitter and collector of the IGBT provides current continuity, and transformer 80 can enhance desired resonance peaks of the gun by an inductively coupled resonating circuit, comprised of a coil 84 and a plurality of different valued capacitors 88 selectable using a switch 86. In the preferred embodiment these elements are contained within the gun structure depicted in FIG. 2.

Typical circuit values are 1.5 microfarads for the main power capacitor 48; 3.7 microhenries for the primary winding 82 of the gun transformer 80; and 430 millihenries for the R. F. guard choke 36. Other preferred values are shown in Table 1 below.

TABLE 1

Preferred Component Values

| Ref. Num. | Type | Ratings |
|---|---|---|
| 9 | capacitor | 0.01 mf, 600 vdc |
| 11 | capacitor | 0.01 mf, 600 vdc |
| 13' | lamp resistor | 47 kohms, ½ watt |
| 23-26 | transformer | 117 vac primary, secondary 24 = 360 vac rms, secondary 26 = 36 vac rms |
| 27 | fuse | ¼ amp slow-blow |
| 29, 30 | diodes | 1N4005 |
| 32 | resistor | 2.7 ohm, 2 watt |
| 36 | choke | 385 millihenries |
| 48 | capacitor | 1.5 mf, 2 kv |
| 49 | IGBT | MG300A2U100 |
| 50 | zener diodes | part of IGBT |
| 51 | zener diodes | part of IGBT |
| 52 | diode | part of IGBT |
| 56 | resistor | 2 megohm, 2 watt |
| 57 | diode | 1N4001 |
| 58 | diode | 1N4001 |
| 59 | diode | 1N4001 |
| 60 | diode | 1N4742 (12-v zener) |
| 61 | diode | 1N4744 (15-v zener) |
| 62 | potentiometer | 1 kohm |
| 66 | potentiometer | 1 kohm |
| 66, 70, 72, 74 | transformer | Nortronics T60-T2 |
| 76, 78 | transistor | 2N3055 |
| 80, 82, 84, 90 | transformer | Core: $A_L$ 125. Primary 82 = 5 microhenries; primary 84 = 4 microhenries; secondary 90 is 2,000 turns |
| 88 | capacitor(s) | 1.1 mfd and 1.4 mfd |
| [not numbered] | resistors and capacitors in multivibrator; resistor near diode 57 | base = 6.8 kohm (2 ea.); emitter = 270 ohms (2 ea.) 0.001 mf, 2 mf (2 ea.) 470 ohm |

The average power product contained in the first, ascending burst pulse is 43 kilowatts. The various frequency domains that are generated during the cosine excursion 40 are spaced 16 degrees apart (as indicated by reference numeral 44) from the beginning of the cosine excursion 40. The high-energy oscillations transpire and are output within a time increment of typically less than two milliseconds.

When the gun switch 55 is squeezed, the gate of the IGBT 49 receives given drive signals. In the typical case, the burst-pulse switch 28 is open and the frequency-sweeping multivibrator feeds the IGBT's 49 gate. The respectively required saturation of core 66 is provided by feeding raw AC 69 over a sweep-width potentiometer 66 into a dedicated core winding 70. The stronger the excitation of the core 66 via winding 70, the greater the sweep width. In the typical case, the opening of switch 68 and closure of switch 28 causes the machine to operate in a single-frequency pulse-burst mode of about 67 kHz. In the sweep-frequency mode, switch 28 is opened and switch 68 closed. Now in the sweep-frequency mode, the machine now operates as a high-voltage, sweep-frequency unit at 15 to 120 kHz.

Power levels in the multi-kilowatt range are made possible by phase-locked capacitor discharge technology first disclosed in applicant's U.S. Pat. No. 4,782,623, and is incorporated herein by reference. In the present circuit a high-energy storage capacitor 48 is charged during the sine excursion of an incoming, half-wave rectified sine wave. The storage capacitor 48 is discharged only during the "dead time" or cosine excursion 40. According to the also phase-locked 64 steering signals received, the IGBT 49 releases the capacitively stored energy in an oscillatory mode into the primary winding 82 of the gun transformer 80. A free-wheeling diode 52 provides the required current continuity under both sweep-frequency and pulse-burst conditions.

A resistor 56 is connected in parallel to the main power capacitor 48 to rapidly dissipate dangerous high-voltage DC potentials when the generator is turned off.

The present invention for electric insect control is chemically non-toxic and prevents risks to public health associated with chemical pest control. It is also much more reliable faster, and efficient than chemical methodologies. The technique is environmentally benign.

The invention may be practiced in many ways other than as specifically disclosed herein. Thus, the scope of the invention should be determined from the appended claims, in which:

What is claimed is:
1. A pest control apparatus comprising:
   an electricity source,
   a power transformer with a primary winding coupled to the source, a first secondary winding driving a driver section, and a second secondary winding driving a frequency generator section inductively coupled to the driver section, and
   an applicator inductively coupled to the driver section.
2. Apparatus of claim 1 wherein the driver section comprises:
   rectifier means coupled to the first secondary winding for feeding a half wave rectified signal to a capacitor and for charging the capacitor during a sine excursion of the half wave rectified signal.
3. Apparatus of claim 2 wherein the driver section further comprises an insulated gate bipolar transistor coupled to the capacitor for discharging the capacitor during a cosine excursion of the rectified signal, a gate of the transistor being inductively coupled to the frequency generator section.

4. Apparatus of claim 3 wherein the gate is selectively coupled to a frequency cascade circuit for delivering, a fixed frequency pulse to the gate.

5. Apparatus of claim 3, the driver section further comprising a plurality of zener diodes for clipping and attenuating signals coupled to the transistor.

6. Apparatus of claim 1 wherein the frequency generator section comprises an astable multivibrator having an input inductively coupled to the second secondary winding and an output separately inductively coupled to the driver section.

7. Apparatus of claim 6 wherein the multivibrator is coupled to first and second transformer windings, each winding being coupled to means for adjusting an induction parameter of the winding.

8. Apparatus of claim 7 wherein the multivibrator is coupled to means for adjusting a sweep width of an output signal of the multivibrator.

9. Apparatus of claim 1 wherein the applicator is inductively coupled to the driver section using a gun transformer coupled to a switch-selectable plurality of capacitors for adjusting resonance of the gun transformer.

* * * * *